US010545688B2

(12) United States Patent
Ward et al.

(10) Patent No.: US 10,545,688 B2
(45) Date of Patent: Jan. 28, 2020

(54) MANAGEMENT OF DATA WRITTEN VIA A BUS INTERFACE TO A STORAGE CONTROLLER DURING CONSISTENT COPYING OF DATA

(71) Applicant: International Business Machines Corporation, Armonk, NY (US)

(72) Inventors: Matthew J. Ward, Vail, AZ (US);
Matthew J. Kalos, Tucson, AZ (US);
Joshua J. Crawford, Tucson, AZ (US);
Carol S. Mellgren, Tucson, AZ (US);
Matthew R. Craig, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 15/868,881

(22) Filed: Jan. 11, 2018

(65) Prior Publication Data
US 2019/0212925 A1 Jul. 11, 2019

(51) Int. Cl.
*G06F 12/00* (2006.01)
*G06F 3/06* (2006.01)
*G06F 13/42* (2006.01)
*G06F 13/16* (2006.01)

(52) U.S. Cl.
CPC .......... *G06F 3/0619* (2013.01); *G06F 3/065* (2013.01); *G06F 3/067* (2013.01); *G06F 13/4234* (2013.01); *G06F 13/1642* (2013.01)

(58) Field of Classification Search
CPC ........ G06F 3/0619; G06F 3/065; G06F 3/067; G06F 13/4234; G06F 13/1642
See application file for complete search history.

(56) References Cited

U.S. PATENT DOCUMENTS

| 7,552,295 | B2 | 6/2009 | Kern et al. |
| 9,405,628 | B2 | 8/2016 | Blea et al. |
| 9,619,331 | B2 | 4/2017 | Blea et al. |

OTHER PUBLICATIONS

Shang et al., "TRAID: Exploiting Temporal Redundancy and Spatial Redundancy to Boost Transaction Processing Systems Performance" dated Apr. 2012, IEEE Transactions on Computers, Total 13 pages.
Ouyang et al., "Beyond Block I/O: Rethinking Traditional Storage Primitives", dated 2011, Total 11 pages.
Anonymous, "GMIR Consistency Group Formation—Surrender Mechanism", dated Jun. 29, 2010, an ip.com Prior Art Database Technical Disclosure, Total 3 pages.
Anonymous, "Technic to Form Consistent Data on Secondary Volume of Global Copy Without Interruption of I/O From Server System" dated Jun. 13, 2012, an ip.com Prior Art Database Technical Disclosure, Total 3 pages.

*Primary Examiner* — Gurtej Bansal
(74) *Attorney, Agent, or Firm* — Rabindranath Dutta; Konrad, Raynes, Davda and Victor LLP

(57) ABSTRACT

Remote copy operations are performed to copy data from a primary storage controller to a secondary storage controller, wherein input/output (I/O) requests are received at the primary storage controller from a host both via a bus interface and a network interface while the remote copy operations are in progress, and wherein consistency groups are formed during the remote copy operations to copy the data consistently. Quiescing of I/O operations performed via the bus interface are performed while a current consistency group is being replaced by a next consistency group during the remote copy operations.

22 Claims, 12 Drawing Sheets

MANAGEMENT OF DATA WRITTEN VIA A BUS INTERFACE TO A STORAGE CONTROLLER DURING CONSISTENT COPYING OF DATA

BACKGROUND

1. Field

Embodiments relate to the management of data written via a bus interface to a storage controller during consistent copying of data.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

In many systems, data may be copied from one storage controller to another storage controller and such copying of data may be referred to as remote copy. The storage controller from which data is copied may be referred to a as a primary storage controller and the storage controller which data is copied may be referred to as a secondary storage controller. One or more storage volumes may be copied from the primary storage controller to the secondary storage controller, where a storage volume may include a plurality of tracks. The copying may comprise mirroring of storage volumes between the primary storage controller and the secondary storage controller for data replication.

Dependent write means that the start of one write operation is dependent upon the completion of a previous write to a storage volume. Dependent writes are the basis for providing consistent data. Providing consistent data means that the order of dependent writes is maintained during data replication. With a consistent copy of data stored in a secondary storage controller, it is possible to quickly recover from a data loss at the primary storage controller.

Certain mirroring mechanisms may control the formation of consistency groups for generating consistency copies of data. A consistency group is a collection of volumes across multiple storage units that are managed together when creating consistent copies of data. The order of dependent writes is preserved in consistency groups. The formation of these consistency groups may be controlled by a primary storage controller which sends commands over remote copy processes and copy volumes to the secondary storage controller.

An out of synchronization (OOS) bitmap identifies which tracks involved in a remote copy relationship have not yet been copied over and are thus protected tracks. Each track is represented by one bit in the bitmap. A bit is set when the corresponding track is to be copied. The bit is reset (i.e., unset) when the corresponding track has been copied from the primary storage controller to the secondary storage controller.

When consistent copies are to be performed between the primary storage controller and the secondary storage controller, a Change Recording (CR) bitmap may be maintained. The CR bitmap has a bit for every track on the source storage volume. When there is a write on a track of the source storage volume after the remote copy relationship has been established for a current consistency group, then a bit is set in the CR bitmap to indicate that the track needs to be copied in the subsequent remote copy for the next consistency group.

U.S. Pat. No. 7,552,295 discusses maintaining consistency when mirroring data using different copy technologies. U.S. Pat. No. 9,619,331 discusses storage unit replacement using point-in-time snap copy. U.S. Pat. No. 9,405,628 discusses data migration using multi-storage volume swap in the context of synchronous input/output operations and copy relationships.

SUMMARY OF THE PREFERRED EMBODIMENTS

Provided are a method, system, and computer program product in which remote copy operations are performed to copy data from a primary storage controller to a secondary storage controller, wherein input/output (I/O) requests are received at the primary storage controller from a host both via a bus interface and a network interface while the remote copy operations are in progress, and wherein consistency groups are formed during the remote copy operations to copy the data consistently. Quiescing of I/O operations performed via the bus interface are performed while a current consistency group is being replaced by a next consistency group during the remote copy operations. As a result, existing mechanisms for global mirror are integrated with I/O operations performed via the bus interface without generating inconsistent copies of data.

In additional embodiments, a syncio process is used to perform writes via the bus interface, and a global mirror process is used to perform the remote copy operations, wherein the global mirror process quiesces the syncio process by performing: indicating each device in a global mirror session as being ineligible for the syncio process; queuing I/O for each device for a time duration during which a new consistency group is being formed; and in response to completion of formation of the new consistency group, indicating each device in the global mirror session as being eligible for the syncio process. As a result, existing mechanisms for global mirror are integrated with syncio without generating inconsistent copies of data.

In yet additional embodiments, in response to determining that a device is indicated as ineligible, a write on a track of the device via the syncio process is avoided. As a result, a consistency group is identified correctly by a syncio process.

In further embodiments, in response to determining that a device is indicated as eligible, a write on a track of the device is allowed via the syncio process by calling a pre-write intercept process to determine a consistency group corresponding to the write on the track of the device. As a result, a consistency group is identified correctly by a syncio process.

In certain embodiments, quiescing of the syncio process prevents a copying of inconsistent data in the global mirror session. As a result, consistent copying of data is performed by the global mirror process when syncio operations are performed in a storage controller.

In additional embodiments, a syncio process is used to perform writes via the bus interface, wherein the syncio process allows the host to hold an application thread in a spin loop waiting for a write operation to complete, and wherein the syncio process performs reservation of tracks for performing writes for a greater duration of time prior to performing the writes on the tracks in comparison to other processes that perform writes on the tracks via the network interface. As a result, in certain embodiments the global mirror process quiesces the syncio process when a new consistency group is formed, and the quiesced syncio process has to call a pre-write intercept process before the next syncio write to determine the new consistency group.

In further embodiments, a first data structure stores identification of tracks to be copied for the current consistency group. A second data structure identification of tracks to be copied for the next consistency group. As a result, the first and second data structures may be used to change the next consistency group to become the current consistency group.

In certain embodiments, the first data structure is an out of synchronization bitmap and wherein the second data structure is a change recording bitmap. As a result, existing out of synchronization bitmaps and change recording bitmaps may be used even when syncio processes are allowed to execute during global mirror sessions.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Syncio (also referred to as sync I/O) comprises an attachment hardware and protocol for computational devices. Syncio is designed for very low latency random reads and small block sequential writes. Syncio connections between computational devices may be over point to point optical Peripheral Component Interconnect Express (PCIe) interfaces. Syncio operations behave differently than traditional I/O in that in syncio a host computational device may hold an application thread in a spin loop while waiting for the I/O operation to complete. This avoids the need for processor cycles to perform the two context swaps of traditional I/O, the need to perform operations for putting the I/O thread to sleep and then re-dispatching the I/O thread, and the need for an I/O interrupt. Syncio operations may be performed by a syncio process and may correspond to a high speed data transfer process from a host to a primary storage controller.

Due to its strict performance requirements, a syncio process may violate a standard rule of one prewrite intercept call (prewrite is also referred to as pre-write) for each write, as is found in previous mechanisms for performing writes in a storage controller. A syncio process may call prewrite intercept once for a track and then write that track multiple times. Prewrite intercept is the mechanism by which a consistent copying mechanism such as global mirror determines which consistency group a write will be in. In global mirror, a consistency group is copied from a primary storage controller to a secondary storage controller, and then once the consistency group is fully copied, the next consistency group is copied. However the consistency group may change in global mirror while syncio is writing a track many times and the syncio is unaware of the change in the consistency group. This can cause inconsistencies in data when dependent writes are placed in an earlier consistency group. There are many other situations in which data may not be copied consistently in the presence of syncio, in existing global mirror mechanisms.

Since it is not possible to rely on the existing prewrite intercept mechanism of determining which writes are part of which consistency group in the presence of an operational syncio process, certain embodiments provide mechanisms in which the change of consistency group is not allowed to cause the syncio process from generating inconsistent data for copying. The global mirror process quiesces devices from I/Os of the syncio process for a very short period of time while the consistency group is being changed. This allows syncio to perform in parallel with global mirror and still maintain data consistency.

Exemplary Embodiments

Figure 1:
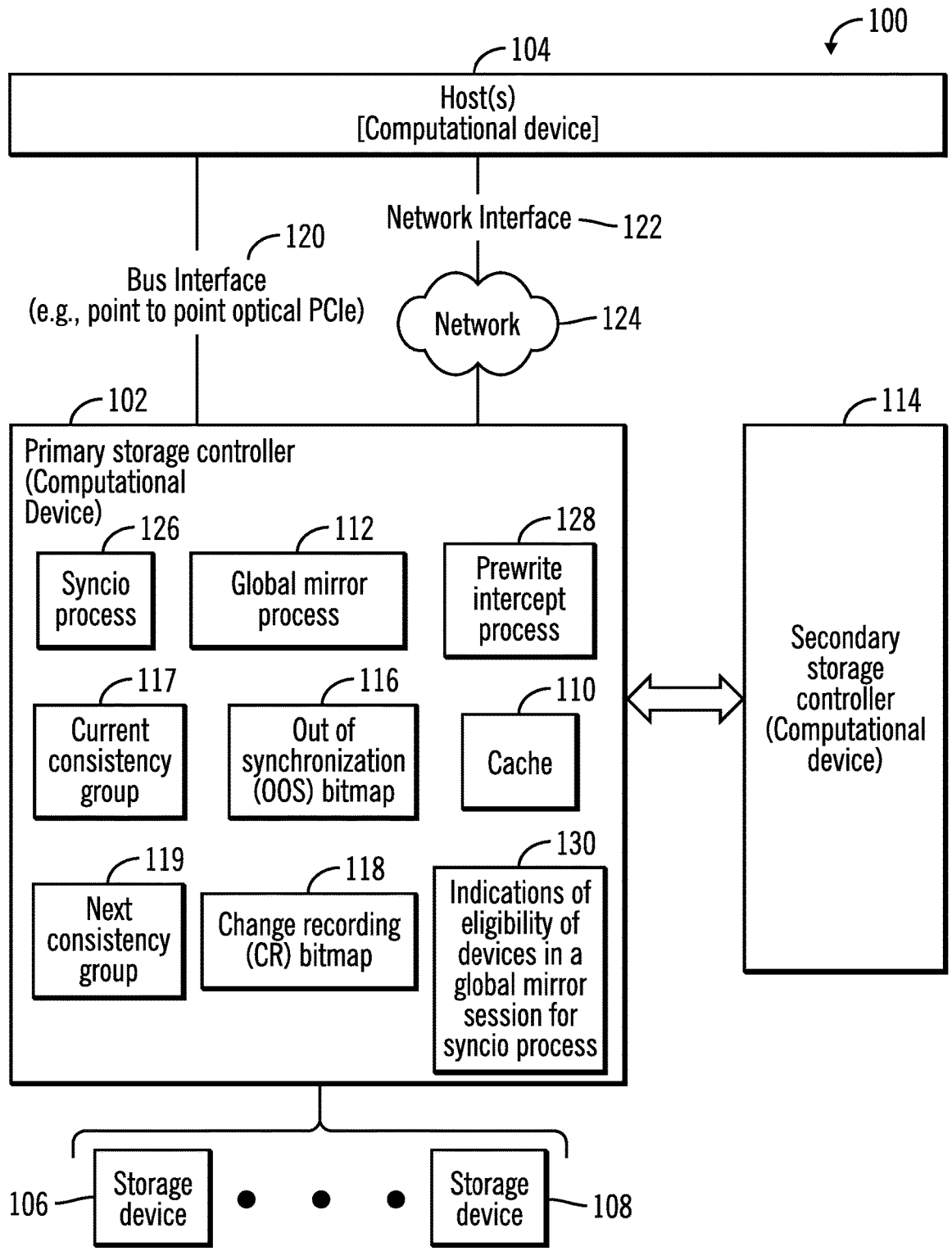
FIG. 1 illustrates a block diagram of a computing environment comprising a primary storage controller coupled to one or more hosts and one or more storage devices, where syncio based writes occur from the one or more hosts to the primary storage controller while a global mirror process is performing operations, in accordance with certain embodiments.

FIG. 1 illustrates a block diagram of a computing environment 100 comprising a primary storage controller 102 coupled to one or more hosts 104 and one or more storage devices 106, 108, where syncio based writes occur from the one or more hosts 104 to the primary storage controller 102 while a global mirror process is performing operations, in accordance with certain embodiments.

The primary storage controller 102 allows the one or more hosts 104 to perform input/output (I/O) operations with logical storage maintained by the primary storage controller 102. The physical storage corresponding to the logical storage may be found in one or more of the storage devices 106, 108 and/or a cache 110 of the primary storage controller 102.

A global mirror process 112 that executes in the primary storage controller 102 may perform copy operations to copy tracks of storage volumes from the primary storage controller 102 to a secondary storage controller 114 in a consistent manner. In other words, consistent copies of data are generated while replicating data from the primary storage controller 102 to the secondary storage controller 114. The global mirror process 112 may be referred to as performing asynchronous remote copy operations, i.e., asynchronous copy operations to copy tracks of storage volumes from one storage controller to another storage controller. In certain embodiments the global mirror process 112 may be implemented in software, firmware, hardware or any combination thereof. In existing mechanisms without syncio processes, the global mirror process 112 copies data consistently from the primary storage controller 102 to the secondary storage controller 114.

The global mirror process 112 uses an out of synchronization (OOS) bitmap 116 that indicates tracks to be copied from the primary storage controller 102 to the secondary storage controller 114 in a current consistency group. Each bit of the OOS bitmap 116 corresponds to a track of a storage volume. If a bit is set (i.e., is assigned to 1) then the corresponding track is to be copied from the primary storage controller 102 to the secondary storage controller 114. If a bit is not set (i.e., unset or reset and is assigned to 0) then the corresponding track does not have to be copied from the primary storage controller 102 to the secondary storage controller 114 for data synchronization.

To perform the consistent copying of data in addition to the OOS bitmap 116 a change recording (CR) bitmap 118 is maintained in the primary storage controller 102. In existing mechanisms, the CR bitmap 118 indicates the tracks to be copied for the next consistency group 119. In existing mechanisms, when new writes on tracks are received when the current consistency group 117 is being copied by using the OOS bitmap 116, then bits corresponding to these tracks are set in the CR bitmap 118 as these tracks will be in the next consistency group to be copied over to the secondary storage controller 114. When the current consistency group 117 is copied over, then the CR bitmap 118 is switched into the OOS bitmap 116 for copying the next consistency group 119 that was being stored in the CR bitmap 118.

The primary storage controller 102, the secondary storage controller 114, and the one or more hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The primary storage controller 102, the secondary storage controller 114 and the one or more hosts 104 may be elements in any suitable network, such as, a storage area network, a wide area network, the Internet, an intranet. In certain embodiments, primary storage controller 102, the secondary storage controller 114, and the one or more hosts 104 may be elements in a cloud computing environment.

In certain embodiments, a host 104 may be coupled to the primary storage controller 102 via a bus interface [e.g., a point to point optical Peripheral Component Interconnect Express (PCIe) interface] 120 and a network interface 122. Syncio operations from the host 104 may be performed over the bus interface 120. Traditional I/O operations from the host 104 may be performed over the network interface 122. The bus interface 120 may comprise a faster access channel for I/O than the network interface 122. Additional bus interface technology to extend the bus interface 120 may be utilized, including PCIe extender cables or components, such as a distributed PCIe switch, to allow PCIe over Ethernet, such as with the ExpEther technology. The network interface 122 may couple the host 104 via a network adapter to a network 124 that includes the primary storage controller 102.

The primary storage controller 102 include a syncio process 126 that allows the performing of syncio based writes from the hosts 104 to the primary storage controller 102. In certain embodiments the syncio process 126 may be implemented in software, firmware, hardware or any combination thereof.

In certain embodiments, a prewrite intercept process 128 (also referred to as pre-write intercept process) implemented in software, firmware, hardware or any combination thereof executes in the primary storage controller 102. For performing a write to a track, processes call the prewrite intercept process 128 and then write to the track. When the prewrite intercept process 128 is called by a process, the consistency group of the global mirror process 112 is determined for writing and the track is reserved for the process.

Processes other than the syncio process 126 call the prewrite intercept process 128 and then quickly write to the track only once and then the track is released. However, the syncio process 126 may call the prewrite intercept process 128 well in advance of the first write by the syncio process 126 to the track. Furthermore, after calling the prewrite intercept process 128, the syncio process 126 may perform multiple writes to the track. Therefore, the syncio process may reserve a track for a considerable amount of time without writing to the track or may reserve a track for a considerable amount of time by performing multiple writes to the track. Thus, the syncio process 126 may reserve a track in anticipation of writing to the track but not actually write to the track immediately after reserving the track.

In certain embodiments, the primary storage controller 102 stores indication for eligibility of devices in a global mirror session for the syncio process (shown via reference numeral 130). If the global mirror process 112 indicates that a device is ineligible for writing via the syncio process 126, then syncio based operations cannot be performed on the device until the device is indicated as being eligible for writing via the syncio process 126. In certain embodiments, the global mirror process 112 indicates a device as ineligible for being written to by the syncio process 126 when the device is being used in a global mirror session between the primary storage controller 102 and the secondary storage controller 114, and a consistency group is being changed.

Therefore, FIG. 1 illustrates certain embodiments in which the global mirror process 112 prevents devices from being written to by the syncio process 126 when a consistency group is being changed, in order to prevent inconsistent data being generated by syncio based writes.

Figure 2:
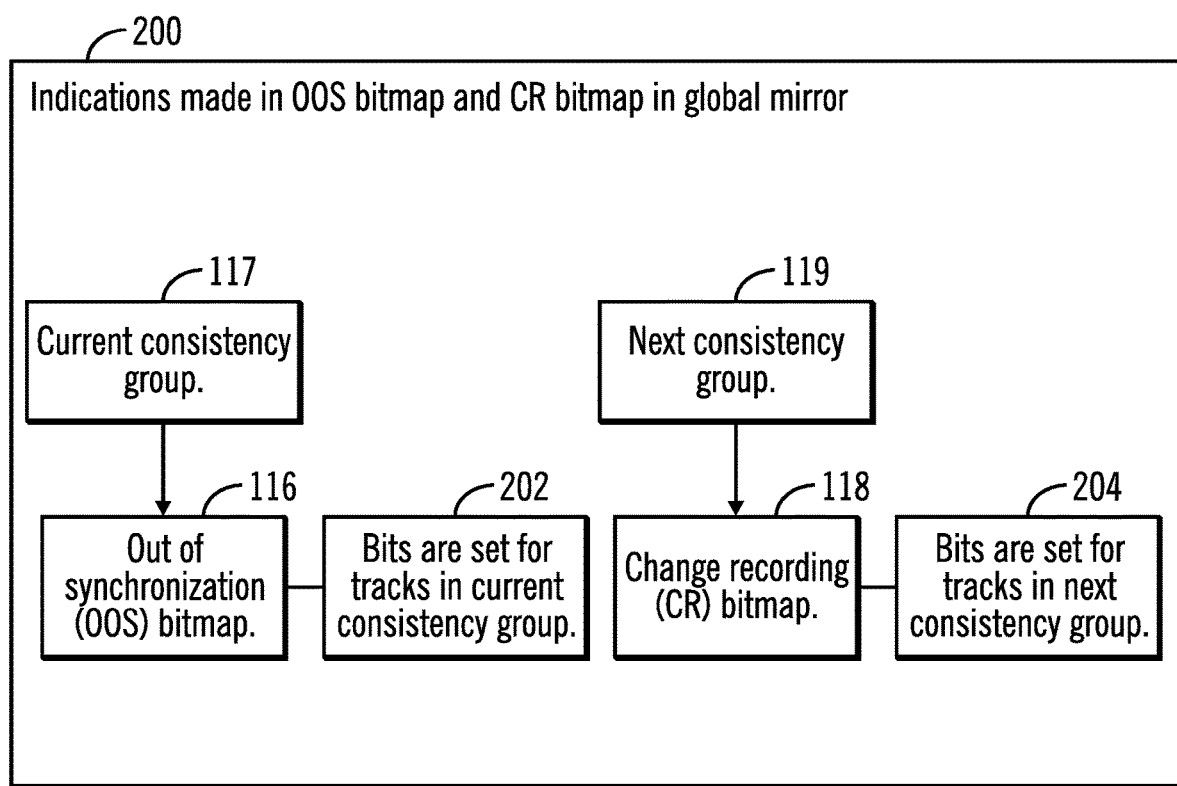
FIG. 2 illustrates a block diagram that shows indications made in an out of synchronization (OOS) bitmap and a change recording (CR) bitmap during a global mirror, in accordance with certain embodiments.

FIG. 2 illustrates a block diagram 200 that shows indications made in an out of synchronization (OOS) bitmap 116 and a change recording (CR) bitmap 118 during a global mirror, in accordance with certain embodiments.

The global mirror process 112 sets bits corresponding to tracks in the current consistency group 117 in the OOS bitmap 116 (as shown via reference numeral 202). The global mirror process 112 sets bits corresponding to tracks in the next consistency group 119 in the CR bitmap 118 (as shown via reference numeral 204).

When the global mirror process 112 completes the copying of the tracks in the current consistency group 117 to the secondary storage controller 114, then the next consistency group 119 becomes the current consistency group for the copying of data. During the time which the consistency group is changed, certain embodiments prevent syncio operations from being performed to avoid creating inconsistent data for copying.

Figure 3:
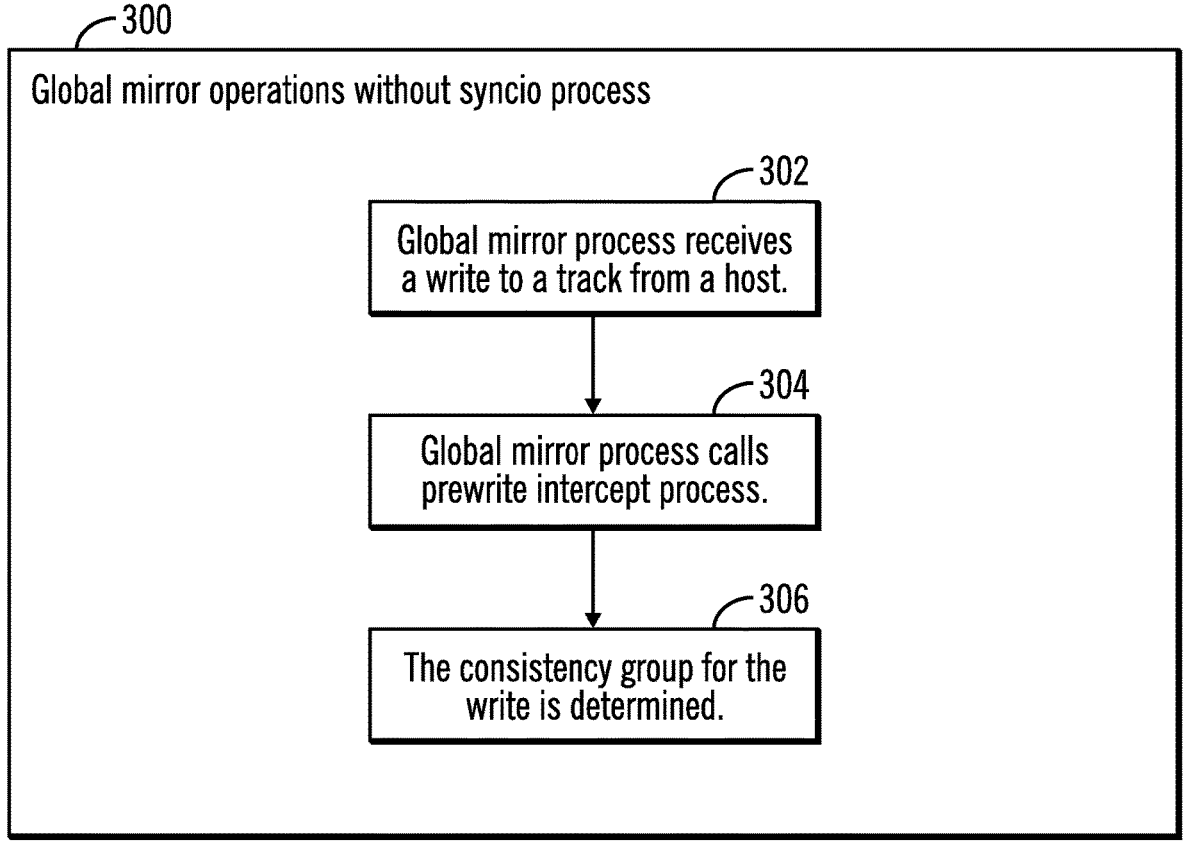
FIG. 3 illustrates a flowchart that shows global mirror operations when there is no operational syncio process, in accordance with certain embodiments.

FIG. 3 illustrates a flowchart 300 that shows global mirror operations when there is no operational syncio process, in accordance with certain embodiments.

Control starts at block 302 in which the global mirror process 112 receives a write operation to write to a track from a host 104. Control proceeds to block 304 in which the global mirror process calls the prewrite intercept process 128. On calling the prewrite intercept process 128, a determination is made (at block 306) of the consistency group for the write.

Therefore, FIG. 3 illustrates that on calling the prewrite intercept process 128 the consistency group for the write is determined.

Figure 4:
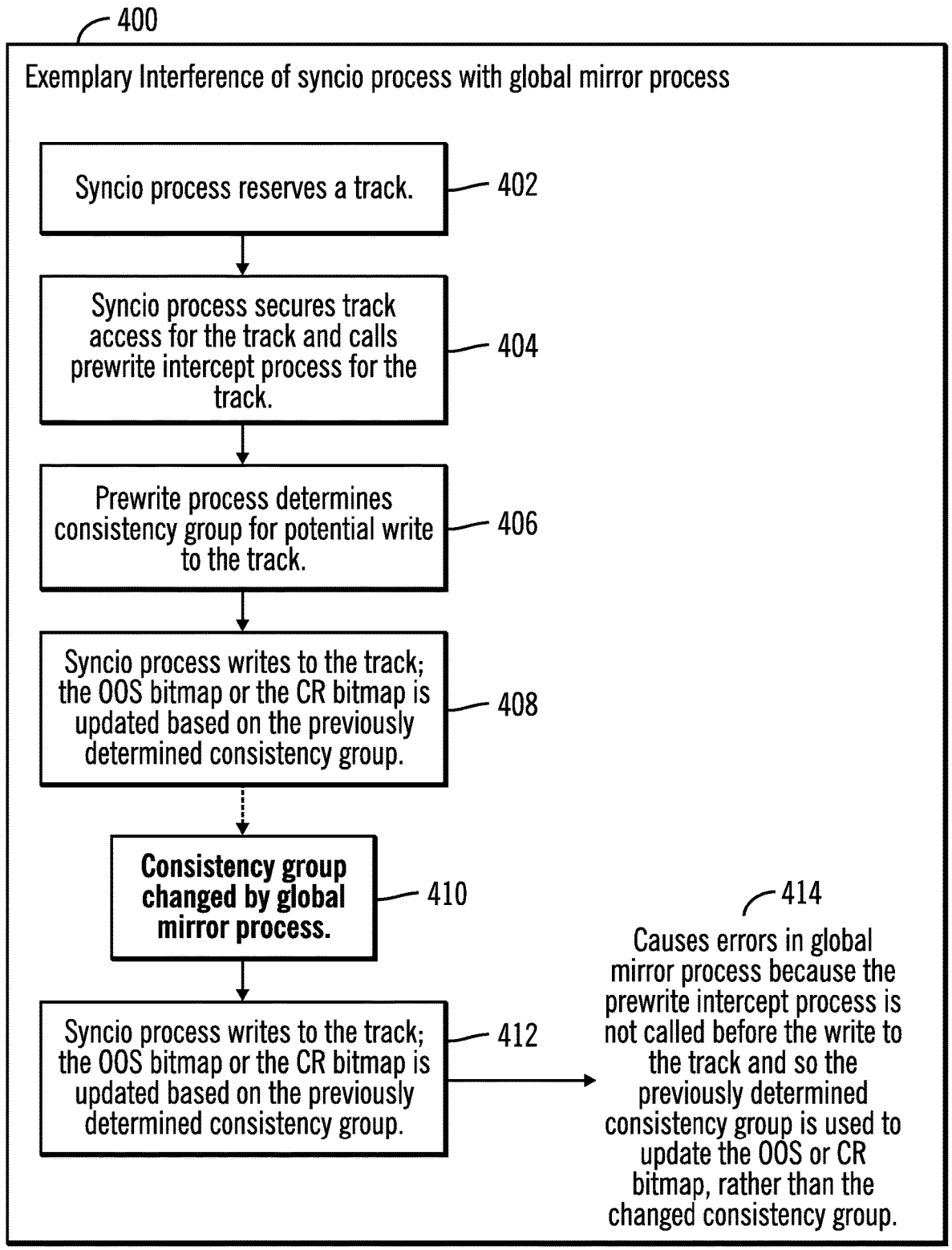
FIG. 4 illustrates a flowchart that shows an exemplary interference of a syncio process with a global mirror process to generate inconsistent data, in accordance with certain embodiments.

FIG. 4 illustrates a flowchart 400 that shows an exemplary interference of a syncio process with a global mirror process to generate inconsistent data, in accordance with certain embodiments.

Control starts at block 402 in which a syncio process 126 reserves a track. The syncio process 126 secures track access for the track and calls (at block 404) the prewrite intercept process 128 for the track. The prewrite intercept process 128 determines (at block 406) the consistency group for potential write to the track.

From block 406 control proceeds to block 408 in which the syncio process 126 writes to the track, and the OOS bitmap 116 or the CR bitmap 118 is updated based on the previously determined consistency group. However, before another write by the syncio process 126 the current consistency group is changed by the global mirror process 112 (at block 410). In existing mechanisms, if the syncio process 126 now writes (at block 412) the OOS bitmap 116 or the CR bitmap 118 is updated based on the previously determined consistency group. As a result errors are caused in the global mirror process 112 because the prewrite intercept process 128 is not called before the write to the track and the previously determined consistency group is used to update the OOS or CR bitmap rather than the changed consistency group (as shown via reference numeral 414).

Figure 5:
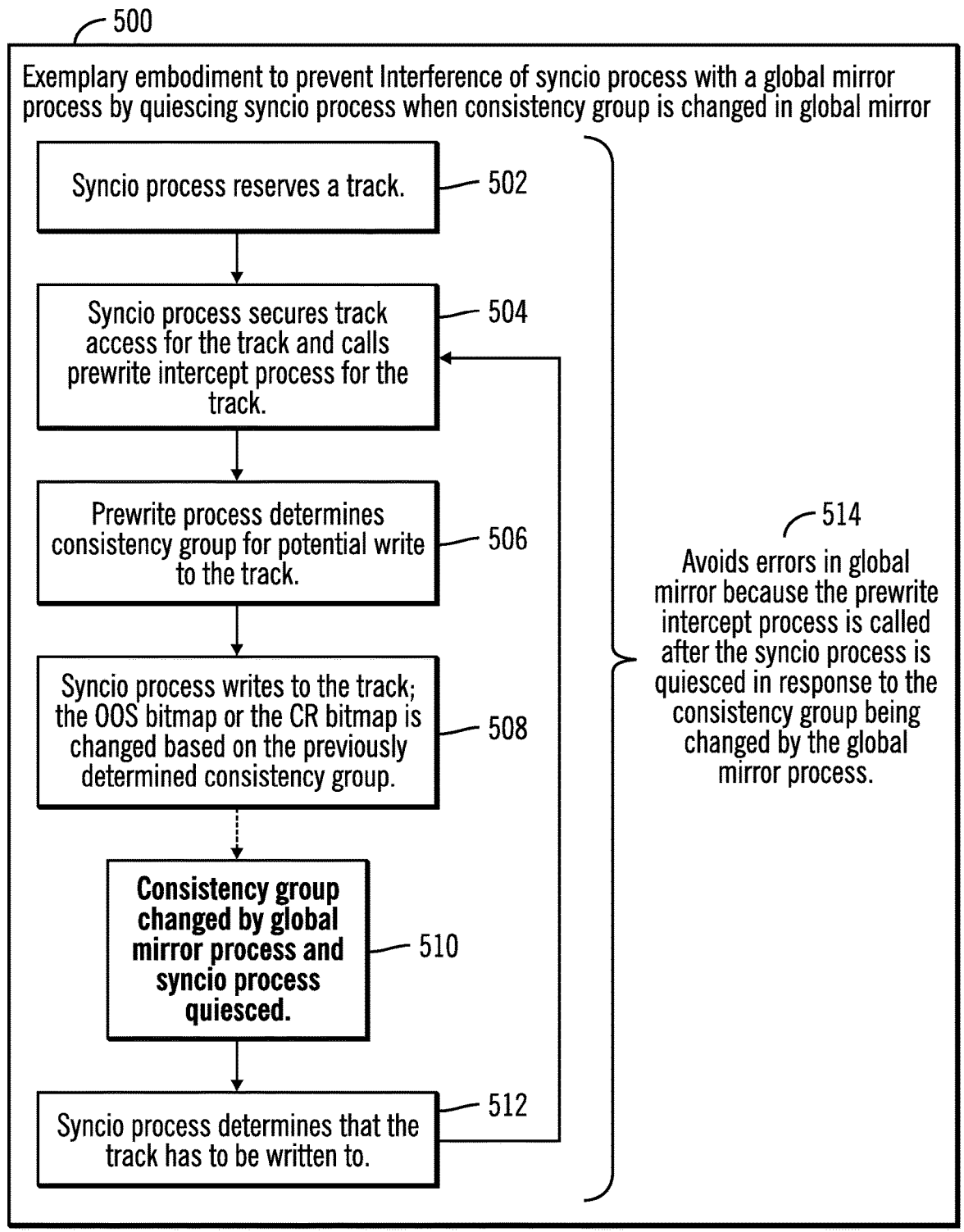
FIG. 5 illustrates a flowchart that shows an exemplary mechanism to prevent interference of a syncio process with a global mirror process by quiescing the syncio process when a consistency group is changed in global mirror, in accordance with certain embodiments.

FIG. 5 illustrates a flowchart 500 that shows an exemplary mechanism to prevent interference of a syncio process with a global mirror process by quiescing the syncio process when a consistency group is changed in global mirror, in accordance with certain embodiments.

Control starts at block 502 in which a syncio process 126 reserves a track. The syncio process 126 secures track access for the track and calls (at block 504) the prewrite intercept process 128 for the track. The prewrite intercept process 128 determines (at block 506) the consistency group for potential write to the track.

From block 506 control proceeds to block 508 in which the syncio process 126 writes to the track, and the OOS bitmap 116 or the CR bitmap 118 is updated based on the previously determined consistency group. However, before another write by the syncio process 126, the current consistency group is changed by the global mirror process 112 (at block 510). In certain embodiments as shown via reference numeral 510, while changing the current consistency group the global mirror process 112 also quiesces the syncio process 126 (i.e., prevents the syncio process 126 from writing to the track).

As a result when the quiesced syncio process 126 determines at block 512 that a new write has be performed on the track, control proceeds to block 504 in which the prewrite intercept process 128 is called. As a result the new write is performed after determining the correct consistency group. The quiescing of the syncio process 126 causes the syncio process 126 to call the prewrite intercept process 128 once again.

FIG. 5 illustrates certain embodiments that avoids errors in global mirror because the prewrite intercept process 128 is called after the syncio process 126 is quiesced in response to the consistency group being changed by the global mirror process 112 (as shown via reference numeral 514).

Figure 6:
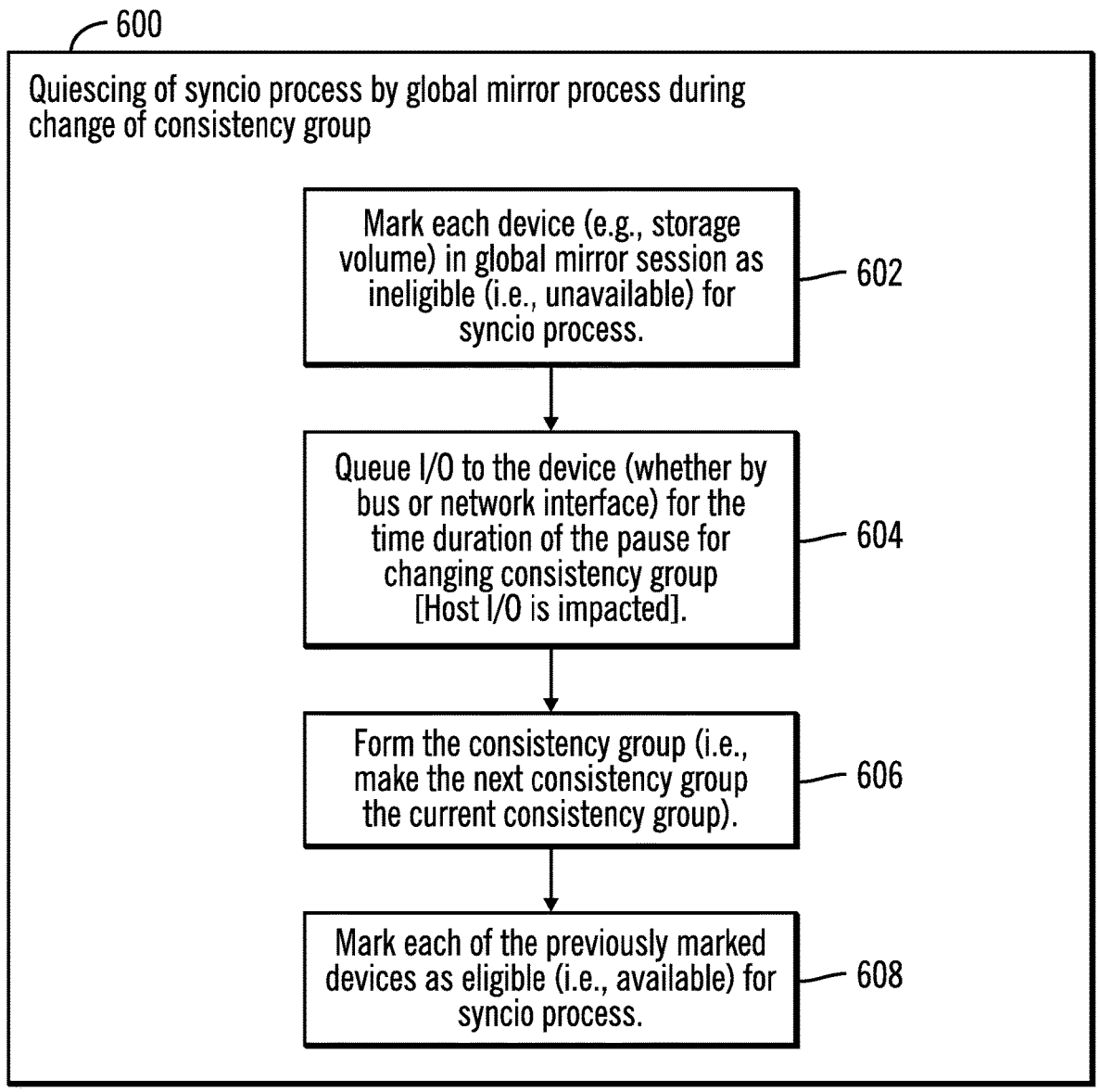
FIG. 6 illustrates a flowchart that shows operations for the quiescing of syncio process by global mirror process during change of consistency group, in accordance with certain embodiments.

FIG. 6 illustrates a flowchart that shows operations for the quiescing of syncio process 126 by the global mirror process 112 during change of consistency group, in accordance with certain embodiments. The operations shown in FIG. 6 may be performed by processes that execute in the primary storage controller 102.

Control starts at block 602 in which the global mirror process 112 marks each device (e.g., storage volume) in a global mirror session as ineligible (i.e., unavailable) for syncio process 126. Control proceeds to block 604 in which the I/O to the device (whether by bus or network interface) is queued for the time duration of the pause for changing consistency group (the host I/O is impacted).

Control proceeds to block 606 in which the consistency group is formed (i.e., make the next consistency group the current consistency group), and each of the previously marked devices is marked as eligible (i.e., available) for the syncio process 126 (at block 608).

Therefore, FIG. 6 illustrates certain embodiments for marking devices as ineligible for syncio while consistency groups are being formed.

Figure 7:
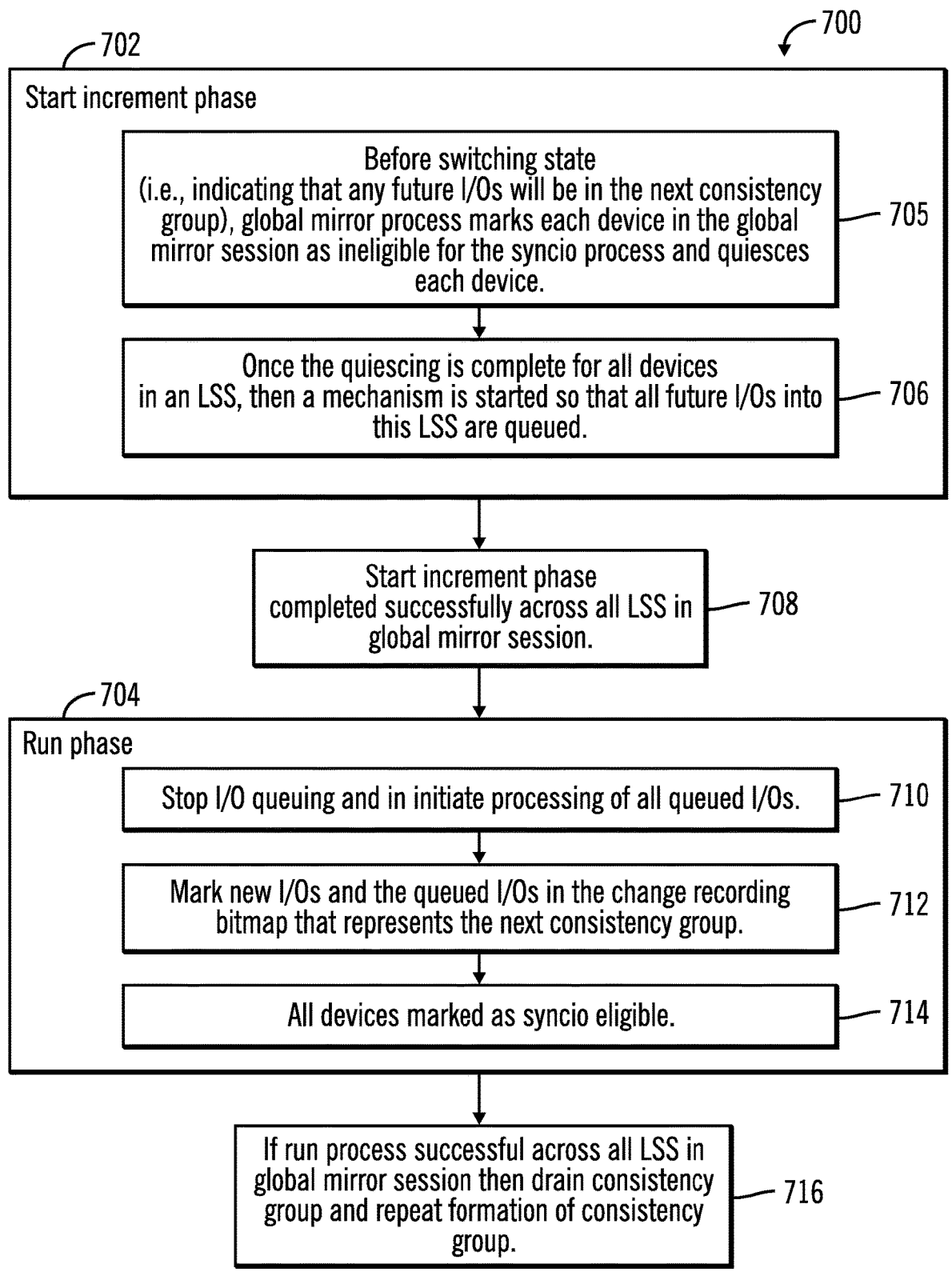
FIG. 7 illustrates a flowchart that shows a start increment phase and a run phase for integrating syncio with global mirror, in accordance with certain embodiments.

FIG. 7 illustrates a flowchart 700 that shows a start increment phase 702 and a run phase 704 for integrating syncio with global mirror, in accordance with certain embodiments. The operations shown in FIG. 7 may be performed by processes that execute in the primary storage controller 102.

In the first phase (start increment phase 702), before switching state (i.e., changing the next consistency group to the current consistency group and indicating that any future I/Os will be in the next consistency group), the global mirror process 112 marks each device in the global mirror session as being ineligible for the syncio process 126 and quiesces each device (at block 705). Marking a device as ineligible for syncio means no syncio writes will be allowed to this device until the device is marked eligible again. Quiescing syncio scan loops (referred to as quiescing syncio) ensures all syncio in progress is completed and track access is released before a device is referred to as quiesced. This has the implication that syncio is required to once again obtain track access and call the prewrite intercept process 128 again for any tracks that have been quiesced. Note that new I/Os may arrive through the network interface 122 or the bus interface 120. No matter which combination of interfaces the new I/Os come in, the I/Os have to be handled. Once the quiescing is complete for all devices in a logical subsystem (LSS), then a mechanism is started so that all future I/O into this LSS are queued (at block 706). I/O is queued until the second phase (run phase 704) is processed. This implies that this process is very performance sensitive as host I/O is impacted while I/O is being queued.

The start increment phase 702 is performed in parallel across multiple LSSs that may span multiple primary storage controllers. The above process needs to complete on all LSSs in the global mirror session in order to move onto the run phase 704. If any LSSs fail, then consistency group formation will not proceed, the process may have to start over (as shown via reference numeral 708).

Once the start increment phase has completed successfully across all LSSs in the global mirror session, then control may move onto the run phase 704.

In the run phase 704, I/O queuing is stopped and all queued I/Os are processed (at block 710). New I/Os are marked in the CR bitmap that represents in the next consistency group (at block 712), and this includes the queued I/Os. At this point all devices are marked as syncio eligible again (as shown via reference numeral 714). Once the run phase 704 is successfully completed across all LSS in the global mirror session, then the consistency group is drained and the consistency group formation process is repeated (at block 716).

By following this procedure, global mirror devices are syncio eligible, except for a short period where global mirror is setting up formation of the current consistency group from the next consistency group, and all data consistency rules are still maintained.

Figure 8:
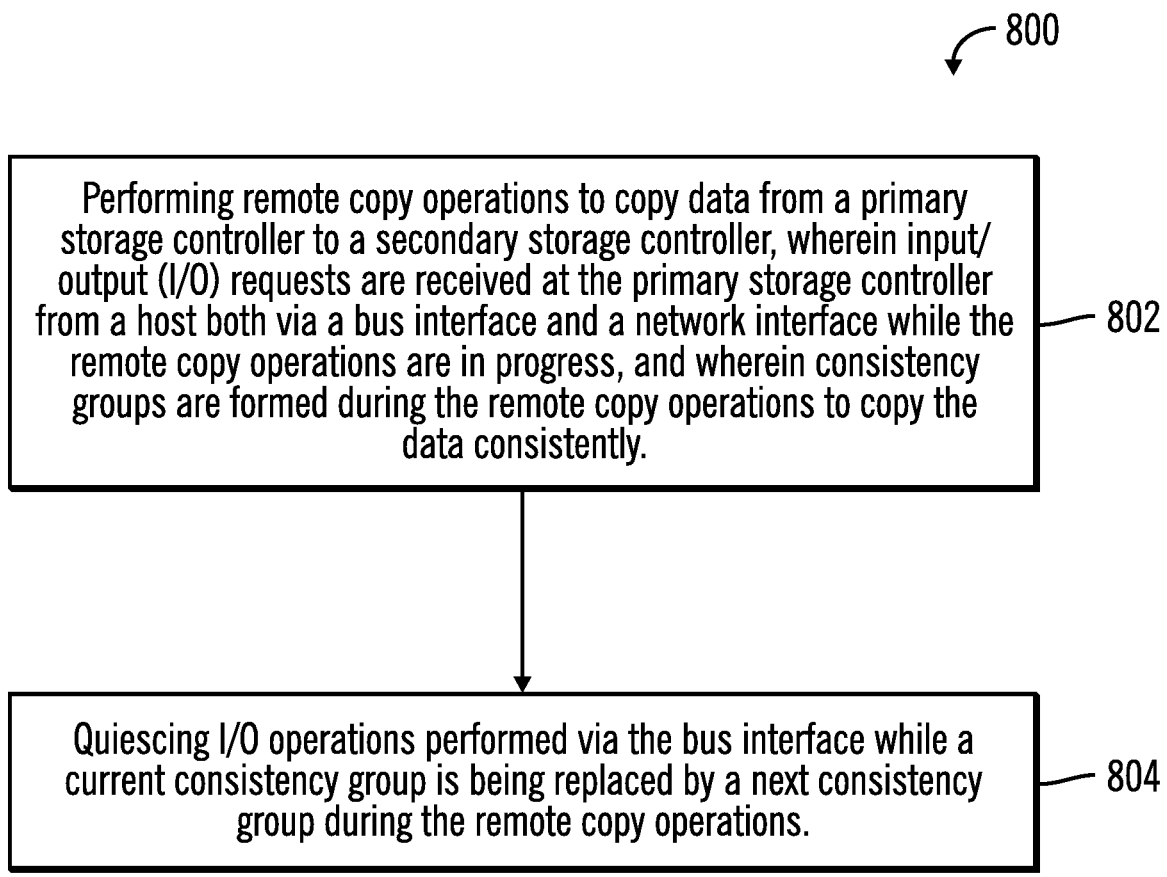
FIG. 8 illustrates a flowchart that shows how to integrate syncio with global mirror, in accordance with certain embodiments.

FIG. 8 illustrates a flowchart 800 that shows how to integrate syncio with global mirror, in accordance with certain embodiments. The operations shown in FIG. 8 may be performed by processes that execute in the primary storage controller 102.

Remote copy operations are performed (at block 802) to copy data from a primary storage controller 102 to a secondary storage controller 114, wherein input/output (I/O) requests are received at the primary storage controller 102 from a host 104 both via a bus interface 120 and a network interface 122 while the remote copy operations are in progress, and wherein consistency groups are formed during the remote copy operations to copy the data consistently. Quiescing of I/O operations performed via the bus interface 120 are performed (at block 804) while a current consistency group is being replaced by a next consistency group during the remote copy operations. As a result, existing mechanisms for global mirror are integrated with I/O operations performed via the bus interface without generating inconsistent copies of data.

Figure 9:
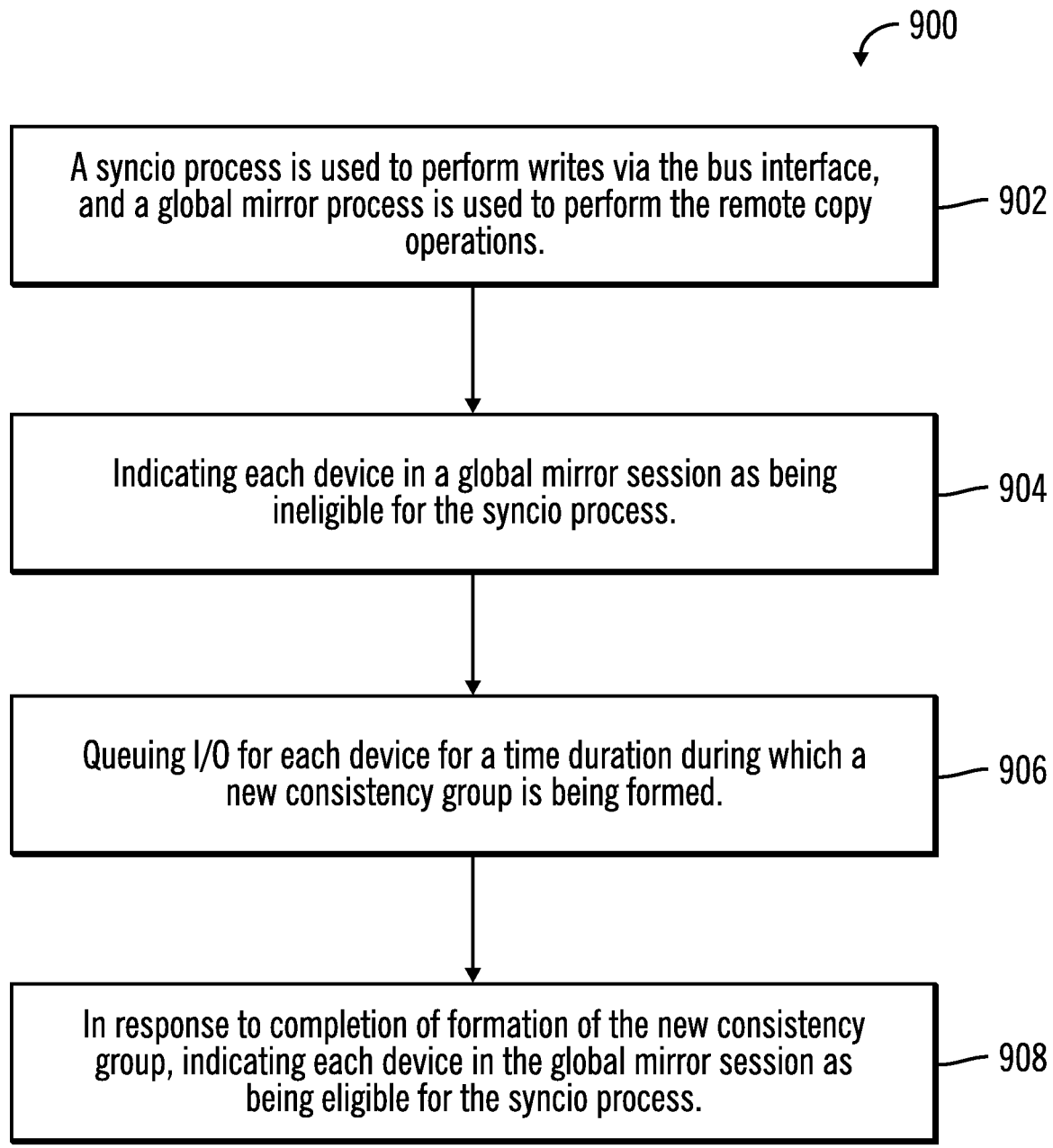
FIG. 9 illustrates a flowchart that shows how to integrate syncio with global mirror by switching device eligibility for the syncio process, in accordance with certain embodiments.

FIG. 9 illustrates a flowchart 900 that shows how to integrate syncio with global mirror by switching device eligibility for the syncio process, in accordance with certain embodiments. The operations shown in FIG. 9 may be performed by processes that execute in the primary storage controller 102.

A syncio process 126 is used to perform writes via the bus interface 120, and a global mirror process 112 is used to perform remote copy operations (at block 902). In certain embodiment, the global mirror process 112 quiesces the syncio process by performing operation shown in blocks 904, 906, 908.

At block 904, the global mirror process 112 indicates each device in a global mirror session as being ineligible for the syncio process 126. The global mirror process 112 queues I/O for each device for a time duration during which a new consistency group is being formed (at block 906).

From block 906 control proceeds to block 908 in which in response to completion of formation of the new consistency group, each device in the global mirror session is indicated as being eligible for the syncio process 126.

As a result of embodiments shown in FIGS. 1-9, existing mechanisms for global mirror are integrated with syncio without generating inconsistent copies of data.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
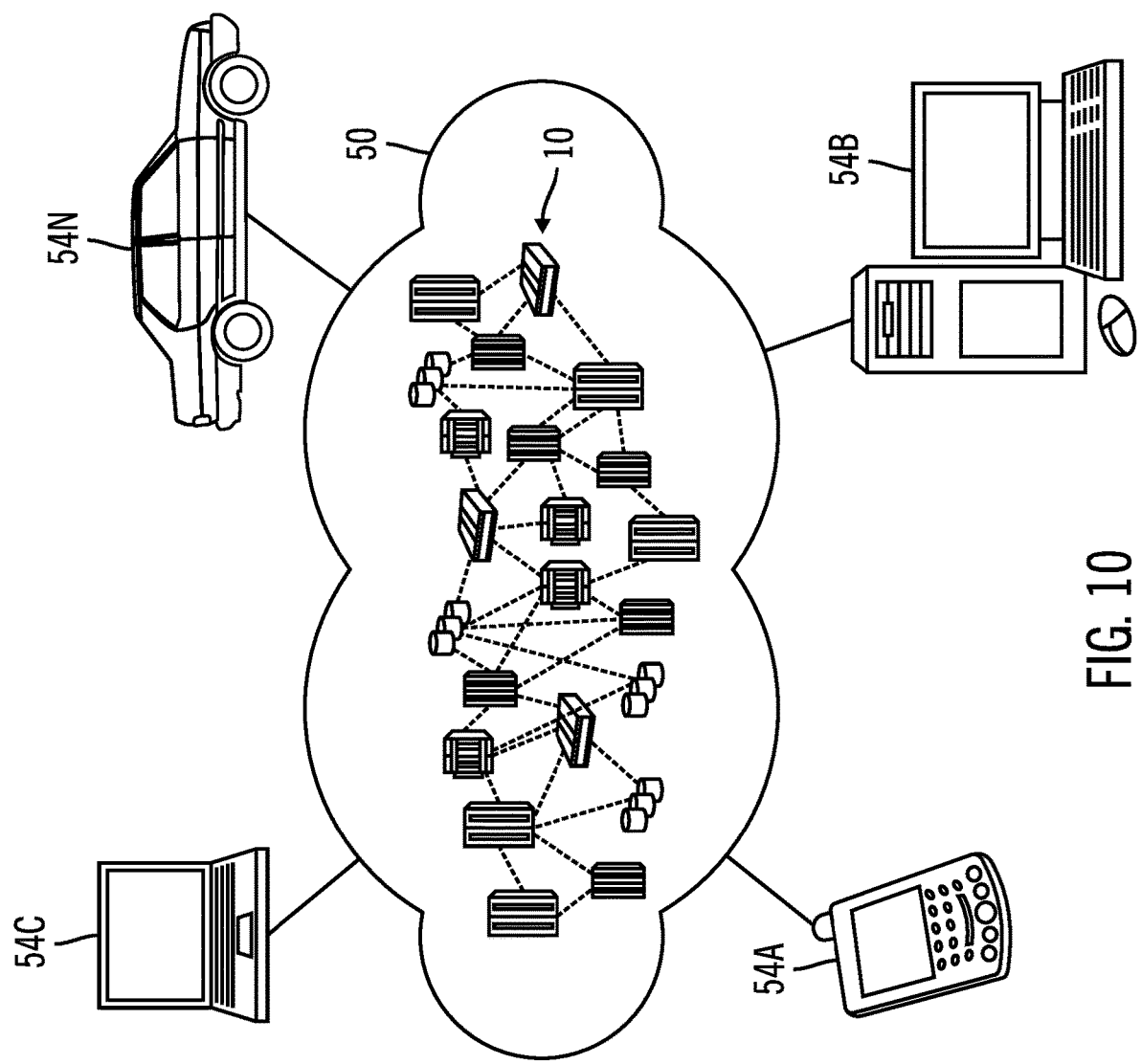
FIG. 10 illustrates a block diagram of a cloud computing environment, in accordance with certain embodiments.

Referring now to FIG. 10 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
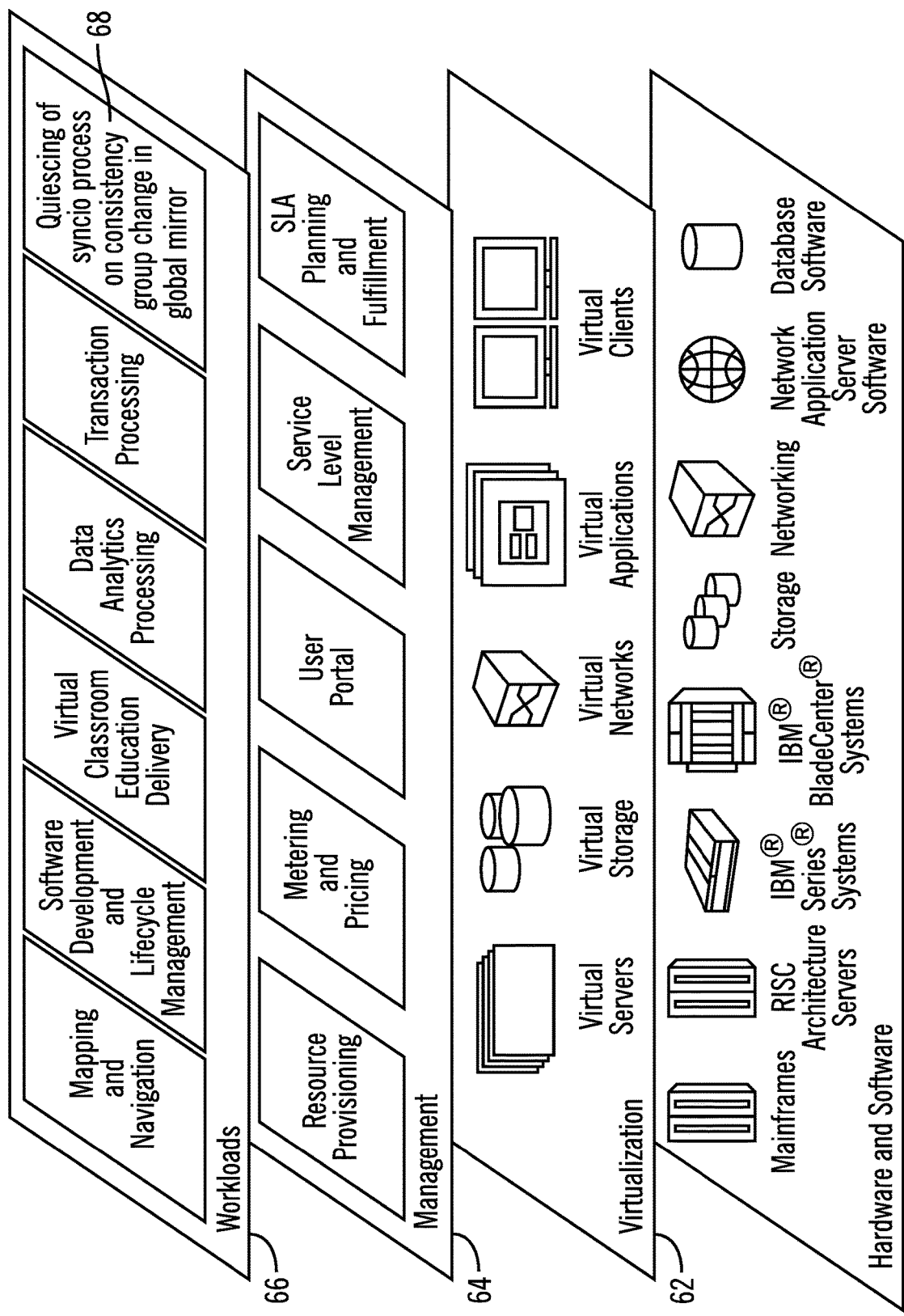
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and quiescing of syncio process on consistency group change in global mirror 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 12:
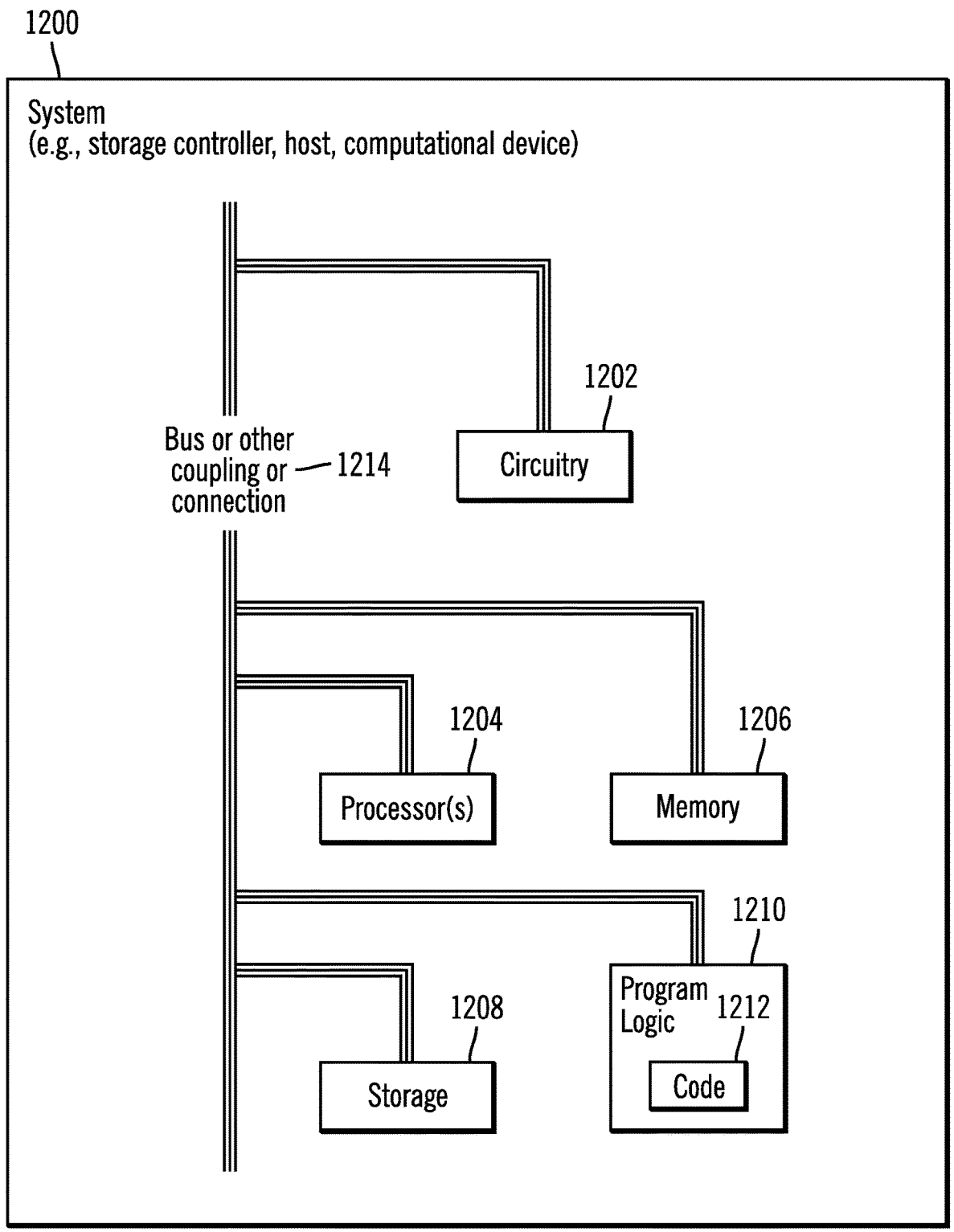
FIG. 12 illustrates a block diagram of a computational system that shows certain elements that may be included in the storage controllers or the host, as described in FIGS. 1-11, in accordance with certain embodiments.

FIG. 12 illustrates a block diagram that shows certain elements that may be included in the primary storage controller 102, the secondary storage controller 114, the hosts 104, or other computational devices in accordance with certain embodiments. The system 1200 may include a circuitry 1202 that may in certain embodiments include at least a processor 1204. The system 1200 may also include a memory 1206 (e.g., a volatile memory device), and storage 1208. The storage 1208 may include a non-volatile memory device (e.g., EEPROM, ROM, PROM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the processor 1204 or circuitry 1202. In certain embodiments, the program logic 1210 including code 1212 may be stored in the storage 1208. In certain other embodiments, the program logic 1210 may be implemented in the circuitry 1202. One or more of the components in the system 1200 may communicate via a bus or via other coupling or connection 1214. Therefore, while FIG. 12 shows the program logic 1210 separately from the other elements, the program logic 1210 may be implemented in the memory 1206 and/or the circuitry 1202.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. A method, comprising:
performing remote copy operations to copy data from a primary storage controller to a secondary storage controller, wherein input/output (I/O) requests are received at the primary storage controller from a host both via a bus interface and a network interface while the remote copy operations are in progress, and wherein consis- tency groups are formed during the remote copy operations to copy the data consistently; and quiescing I/O operations performed via the bus interface while a current consistency group is being replaced by a next consistency group during the remote copy operations, wherein a syncio process is used to perform writes via the bus interface, and a global mirror process is used to perform the remote copy operations, and wherein the global mirror process quiesces the syncio process by performing:

indicating each device in a global mirror session as being ineligible for the syncio process;

queuing I/O for each device for a time duration during which a new consistency group is being formed; and in response to completion of formation of the new consistency group, indicating each device in the global mirror session as being eligible for the syncio process.

2. The method of claim 1, the method further comprising:
in response to determining that a device is indicated as ineligible, avoiding a write on a track of the device via the syncio process.

3. The method of claim 1, the method further comprising:
in response to determining that a device is indicated as eligible, allowing a write on a track of the device via the syncio process by calling a pre-write intercept process to determine a consistency group corresponding to the write on the track of the device.

4. The method of claim 1, wherein quiescing of the syncio process prevents a copying of inconsistent data in the global mirror session.

5. The method of claim 1, wherein a syncio process is used to perform writes via the bus interface, wherein the syncio process allows the host to hold an application thread in a spin loop waiting for a write operation to complete, and wherein the syncio process performs reservation of tracks for performing writes for a greater duration of time prior to performing the writes on the tracks in comparison to other processes that perform writes on the tracks via the network interface.

6. The method of claim 1, the method further comprising:
storing in a first data structure identification of tracks to be copied for the current consistency group; and
storing in a second data structure identification of tracks to be copied for the next consistency group.

7. The method of claim 6, wherein the first data structure is an out of synchronization bitmap and wherein the second data structure is a change recording bitmap.

8. A system, comprising:
a memory; and
a processor coupled to the memory, wherein the processor performs operations, the operations comprising:
performing remote copy operations to copy data from a primary storage controller to a secondary storage controller, wherein input/output (I/O) requests are received at the primary storage controller from a host both via a bus interface and a network interface while the remote copy operations are in progress, and wherein consistency groups are formed during the remote copy operations to copy the data consistently; and
quiescing I/O operations performed via the bus interface while a current consistency group is being replaced by a next consistency group during the remote copy operations, wherein a syncio process is used to perform writes via the bus interface, and a global mirror process is used to perform the remote copy operations, and wherein the global mirror process quiesces the syncio process by performing:

indicating each device in a global mirror session as being ineligible for the syncio process;

queuing I/O for each device for a time duration during which a new consistency group is being formed; and in response to completion of formation of the new consistency group, indicating each device in the global mirror session as being eligible for the syncio process.

9. The system of claim 8, the operations further comprising:
in response to determining that a device is indicated as ineligible, avoiding a write on a track of the device via the syncio process.

10. The system of claim 8, the operations further comprising:
in response to determining that a device is indicated as eligible, allowing a write on a track of the device via the syncio process by calling a pre-write intercept process to determine a consistency group corresponding to the write on the track of the device.

11. The system of claim 8, wherein quiescing of the syncio process prevents a copying of inconsistent data in the global mirror session.

12. The system of claim 8, wherein a syncio process is used to perform writes via the bus interface, wherein the syncio process allows the host to hold an application thread in a spin loop waiting for a write operation to complete, and wherein the syncio process performs reservation of tracks for performing writes for a greater duration of time prior to performing the writes on the tracks in comparison to other processes that perform writes on the tracks via the network interface.

13. The system of claim 8, the operations further comprising:
storing in a first data structure identification of tracks to be copied for the current consistency group; and
storing in a second data structure identification of tracks to be copied for the next consistency group.

14. The system of claim 13, wherein the first data structure is an out of synchronization bitmap and wherein the second data structure is a change recording bitmap.

15. A computer program product, the computer program product comprising a computer readable storage medium having computer readable program code embodied therewith, the computer readable program code configured to perform operations, the operations comprising:
performing remote copy operations to copy data from a primary storage controller to a secondary storage controller, wherein input/output (I/O) requests are received at the primary storage controller from a host both via a bus interface and a network interface while the remote copy operations are in progress, and wherein consistency groups are formed during the remote copy operations to copy the data consistently; and
quiescing I/O operations performed via the bus interface while a current consistency group is being replaced by a next consistency group during the remote copy operations, wherein a syncio process is used to perform writes via the bus interface, and a global mirror process is used to perform the remote copy operations, and wherein the global mirror process quiesces the syncio process by performing:

indicating each device in a global mirror session as being ineligible for the syncio process;

queuing I/O for each device for a time duration during which a new consistency group is being formed; and in response to completion of formation of the new consistency group, indicating each device in the global mirror session as being eligible for the syncio process.

16. The computer program product of claim 15, the operations further comprising:
in response to determining that a device is indicated as ineligible, avoiding a write on a track of the device via the syncio process.

17. The computer program product of claim 15, the operations further comprising:
in response to determining that a device is indicated as eligible, allowing a write on a track of the device via the syncio process by calling a pre-write intercept process to determine a consistency group corresponding to the write on the track of the device.

18. The computer program product of claim 15, wherein quiescing of the syncio process prevents a copying of inconsistent data in the global mirror session.

19. The computer program product of claim 15, wherein a syncio process is used to perform writes via the bus interface, wherein the syncio process allows the host to hold an application thread in a spin loop waiting for a write operation to complete, and wherein the syncio process performs reservation of tracks for performing writes for a greater duration of time prior to performing the writes on the tracks in comparison to other processes that perform writes on the tracks via the network interface.

20. The computer program product of claim 15, the operations further comprising:
storing in a first data structure identification of tracks to be copied for the current consistency group; and
storing in a second data structure identification of tracks to be copied for the next consistency group.

21. The computer program product of claim 20, wherein the first data structure is an out of synchronization bitmap and wherein the second data structure is a change recording bitmap.

22. A primary storage controller, comprising:
a memory; and
a processor coupled to the memory, wherein the processor performs operations, the operations performed by the processor comprising:
performing remote copy operations to copy data from the primary storage controller to a secondary storage controller, wherein input/output (I/O) requests are received at the primary storage controller from a host both via a bus interface and a network interface while the remote copy operations are in progress, and wherein consistency groups are formed during the remote copy operations to copy the data consistently; and
quiescing I/O operations performed via the bus interface while a current consistency group is being replaced by a next consistency group during the remote copy operations, wherein a syncio process is used to perform writes via the bus interface, and a global mirror process is used to perform the remote copy operations, and wherein the global mirror process quiesces the syncio process by performing:
indicating each device in a global mirror session as being ineligible for the syncio process;
queuing I/O for each device for a time duration during which a new consistency group is being formed; and
in response to completion of formation of the new consistency group, indicating each device in the global mirror session as being eligible for the syncio process.

* * * * *